May 14, 1940.　　　D. W. SMITH　　　2,200,347
PIE MAKING MACHINE
Filed May 5, 1939　　　2 Sheets-Sheet 1

Inventor:
Dennis W. Smith,

Witness:

May 14, 1940.  D. W. SMITH  2,200,347
PIE MAKING MACHINE
Filed May 5, 1939   2 Sheets-Sheet 2
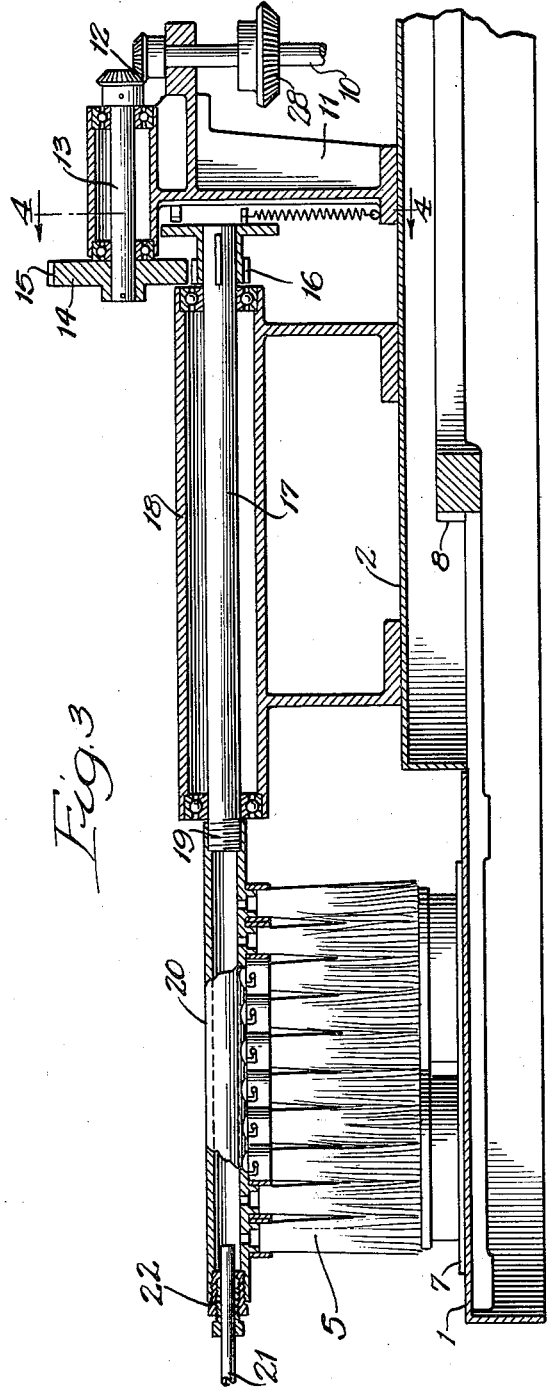
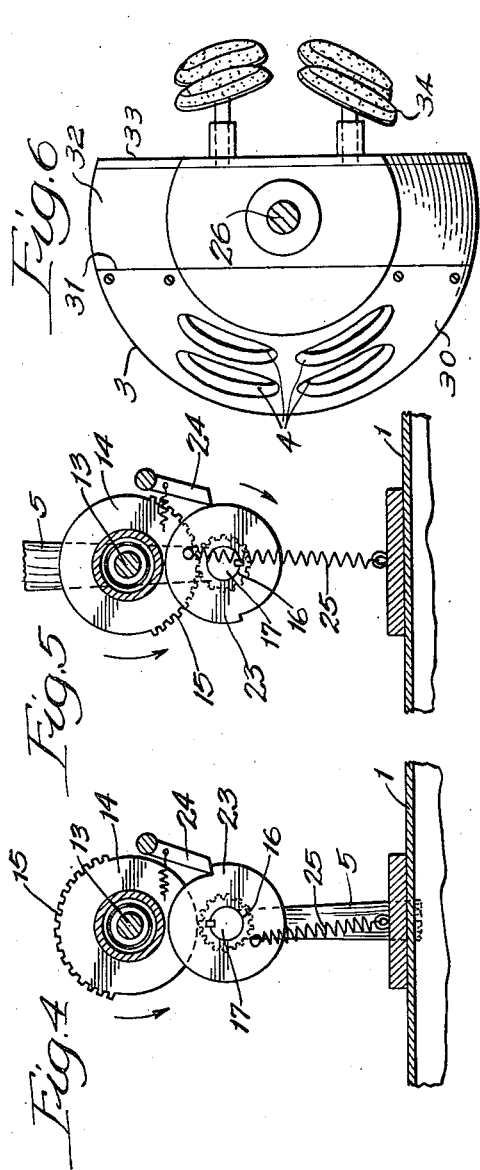
Inventor:
Dennis W. Smith,
By Rummler, Rummler + Woodworth
Attorneys.
Witness:
H. I. Sekut Patented May 14, 1940

2,200,347

UNITED STATES PATENT OFFICE 2,200,347

PIE MAKING MACHINE

Dennis W. Smith, Chicago, Ill., assignor to Colborne Manufacturing Company, Chicago, Ill., a corporation of Illinois Application May 5, 1939, Serial No. 271,929

6 Claims. (Cl. 107—1)

This invention relates to improvements in pie machines, and more particularly to the employment therewith of an odd number of pie-plate holders in combination with continuously driven pie-making appliances timed for alternate contact with the plates and obviating the need for throwout mechanism.

For economy of construction and space in pie manufacturing, this machine involves an arrangement wherein the different pie-making operations are performed alternately on pies supported by a conveyor moving in a circuitous path cooperant with pie-making instruments. The pies are partly constructed during one rotation and completed on the next. Thus an odd number of plate holders is essential for successive operations on pies traveling twice around the circuit.

Included in the pie-making operations are those of placing lower crusts in empty pie plates, filling and moistening the crusts, placing upper crusts thereon, trimming excess dough from the crusts, and finally, removing the completed pies from the conveyor. Each pie is followed by another in a different stage of development and for that reason, mechanism operating on a pie at one stage does not contact with the pie following. The present machine is designed to eliminate complications and inconveniences of structure and operation existing in the prior machines with reference to the crust trimming and moistening means.

Therefore, it is an object of the invention to provide for simplicity of construction and action in pie trimming and moistening mechanisms used cooperantly with a pie machine including a succession of pie-plate holders carried by a rotating conveyor; to provide an improved crust-moistening brush comprising a rotating hollow shaft having bristles on one side only; to provide a rolling crust trimmer having a cut-away portion opposite the operative face thereof; and to time the rotation of the shafts with the rotation of the conveyor so that during alternate passage of pies the crust trimming and moistening mechanism will be out of coaction with the plates. A further object is the provision of a conveyor with an odd number of pie-plate holders, thereby causing the ultimate cooperation of all the plates with the pie-forming mechanisms.

The improvement is illustrated by the accompanying drawings, wherein:

Fig. 3 is a sectional view taken on line 3—3 of Fig. 1.

Fig. 4 is a sectional detail taken on line 4—4 of Fig. 3, and shows a pawl and ratchet arrangement for intermittently retaining the brush in operative position.

Fig. 5 is a view of the mechanism shown in Fig. 4, showing the pawl out of holding position.

Fig. 6 is an end view of the crust trimmer.

Figure 1:
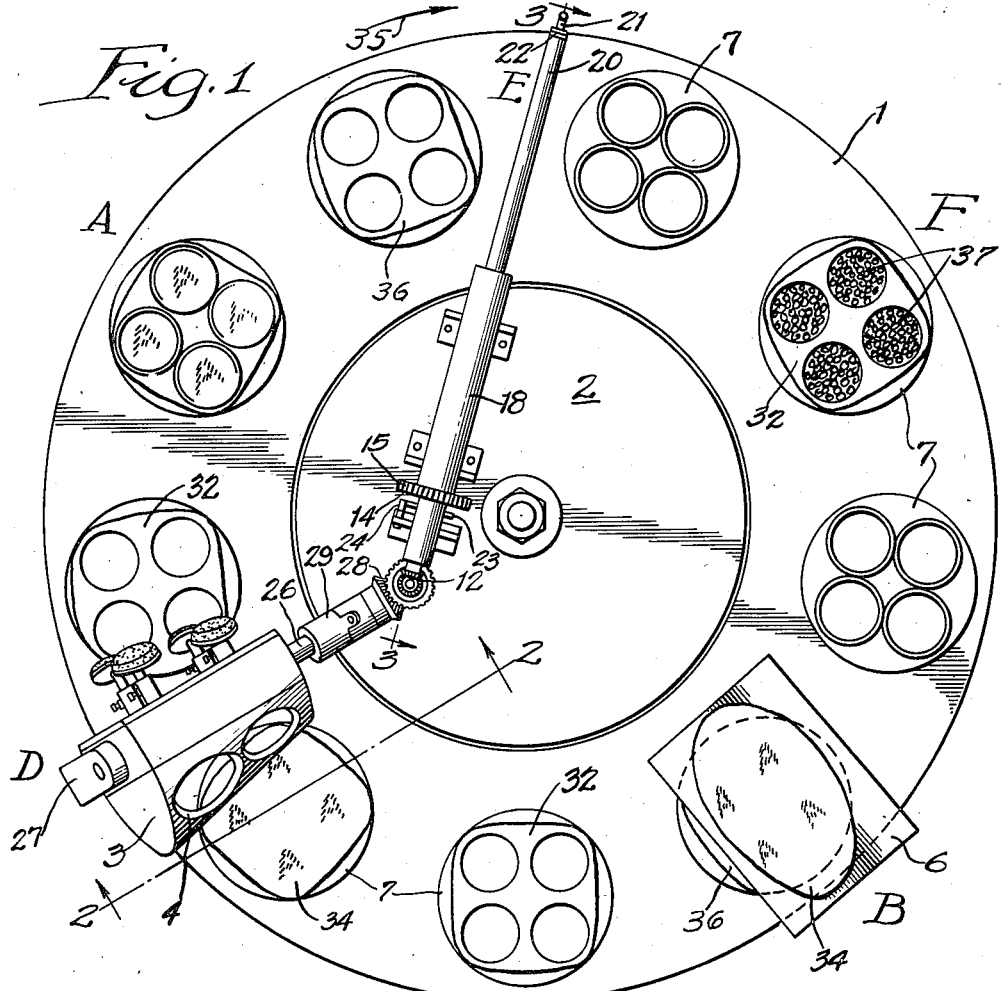
Figure 1 is a plan view of the machine showing an odd number of holders arranged in series on a conveyor, a pie-crust delivery chute, a crust trimmer, and the top side of a crust-moistening brush.
Figure 2:
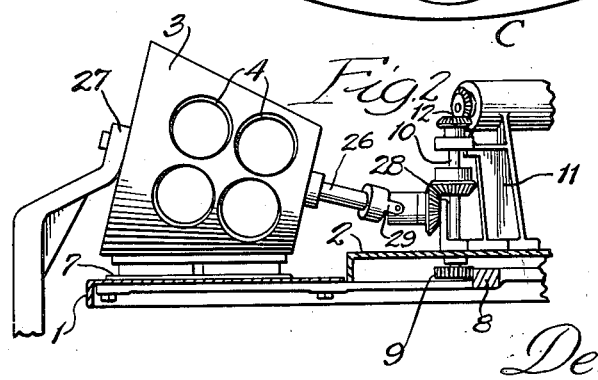
Fig. 2 shows in elevation the drive means for effecting rotation of the crust trimmer and the crust-moistening brush in timed cooperation with the conveyor. The conveyor and a stationary table are indicated in section.

As shown in Figure 1, a ring-shaped conveyor I rotates around a circular stationary table 2 supporting operating machinery including crust-forming rollers, not shown. A crust trimmer 3, comprising a halved frustum of a cone having shearing edges 4 in the peripheral surface, a crust-moistening brush 5, and a pie-crust delivery chute 6 extend from the table 2 to positions over the path of an uneven number of pie-plate holders 7 annularly mounted on the conveyor I.

The conveyor is coaxially rigid with a driven gear 8 located underneath the table top. The large gear 8 meshes with a pinion 9 having a shaft 10 extending above the table top 2, and journalled thereon by a supporting element 11. Shaft 10 rotates the crust-moistening brush 5 through a pair of geared-together horizontal shafts, which extend across the table 2 to the brush 5 and to which the shaft 10 is connected by bevel gearing 12. The horizontal shaft arrangement comprises a short shaft 13 leading from bevel gearing 12 to a mutilated gear 14. Teeth 15 of mutilated gear 14 mesh with a gear 16 fast on a shaft 17 journalled in a supporting element 18 and extending to the edge of the table 2. Shaft 17 is threaded at 19 into a hollow stock 20 for the moistening brush 5, the stock 20 being arranged to admit water to the brush 5 from a fixed conduit 21 connected to the outer end of the stock 20 by a sealing joint 22.

Shaft 17 also carries a single-toothed ratchet 23 having engagement with a spring-pressed stop pawl 24 carried by a supporting element 11.

The crust trimmer 3 rotates with a shaft 26. The shaft 26 inclines downwardly from a bearing bracket 27, located outside the conveyor I, to bevel gearing 28 connecting shaft 26 with shaft 10. Shaft 26 is connected to the gearing 28 by a universal joint 29.

Because of the gear ratio, the crust trimmer 3 rotates continuously with the table 2 at a speed to bring the shearing edges 4 down into contact with every second plate holder 7.

Shaft 13 for driving the crust-moistening brush rotates mutilated gear 14 continuously, the timing being such that after a crust has been moistened the teeth 15 engage gear 16 to rotate the brush 5 clear of the next plate holder. Ratchet 23 turns with the gear 16, and at the position shown in Fig. 4, that is when the brush 5 is pointing downwardly, is engaged by pawl 24. In that position the tension of the spring 25 acts to hold the brush 5 firmly in its downward position during the passage of a plate unit 7. Mutilated gear 14 meanwhile continues to rotate independently of gear 16, as shown in Fig. 5, until the teeth 15 again engage gear 16. Mutilated gear 14 then overcomes the action of spring 25 and rotates brush 5 upwardly.

A crust-forming mechanism, not shown, is synchronized with the rotation of the conveyor to discharge a crust to the delivery chute 6 during each successive passage of the pie plates.

The crust trimmer 3 is preferably formed to provide for the removal of the operating face 30 along the line 31 from the body portion of the trimmer 32. Single apertured element 30 may thus be substituted for the one with the multiple openings illustrated in the drawings and thereby fit the machine for operating upon single pies to a holder. The cut-away face of the trimmer 3 is arranged for carrying a plate 33, Fig. 6, upon which are mounted what is known in the art as dockers 34. These may be faced with rubber and are of the proper form to register with pie plates and press the bottom crusts down before the crusts receive the filling. In the manufacture of pies, the docker operation is not always necessary but heretofore when dockers were used, such devices were operated by hand.

The operation of the machine is as follows:

Conveyor 1 rotates continuously in a right-hand direction, as indicated by the arrow 35 in Fig. 1. Empty pie plates may be placed on unoccupied holders 7 at any point between the stations A and B to the right of station A. Station A is where completed pies and trimmings are removed.

The crust-delivery chute 6 at station B alternately delivers lower and upper crusts.

A lower crust 36 as indicated is placed on a pie plate at station C. When this particular pie plate arrives at station D where the trimmer is located, the cut-away face of the trimmer is then opposite the plate and thus there is no coaction between the trimmer and plates carrying the lower crusts only. At E the rim of the lower crust is moistened, the brush then being in the down position, as indicated by Figures 3 and 4. When a lower crust-bearing plate arrives at station F, the pie-filling material is received as indicated by the numeral 37 at this station. When the filled plates again arrive at station C upper crusts are placed thereon. As the trimmer is effective only on alternative plates, and there is an odd number of plate holders, the second arrival of a pie at the trimmer results in cooperation with the trimmer. The completed pies are removed from alternate plate holders at station A after traveling around the machine one and a fraction times.

I claim:

1. A pie-making machine comprising circuitous conveying means, an odd number of pie-plate holders thereon; and means for successively placing lower crusts and moistening lower crusts only for each alternate holder, whereby other operations may be simultaneously performed on pies supported by intermediate holders.

2. In a pie-making machine employing circuitous conveying means, an odd number of pie-plate holders on said means; a rotating crust-moistening brush, a rotating crust trimmer, a drive for the machine having connections for continuously operating said circuitous conveying means, and connections for making operative the crust-moistening brush and crust trimmer during passage of only alternate pie-plate holders thereunder.

3. In a pie-making machine employing circuitous conveying means, an odd number of pie-plate holders on said means, a crust-moistening brush comprising a rotatable stock provided with bristles on one side and none on the opposite side, a drive for the machine having connections for continuously operating said circuitous conveying means and for rotating said brush to produce contact of the bristles with pie crusts on alternate plate holders.

4. In a pie-making machine employing circuitous conveying means, an odd number of pie-plate holders thereon, a rotating crust trimmer having an operative face on one side and a cut-away face on the opposite side, a drive for the machine having connections for continuously operating said conveyor means, and connections for rotating said crust trimmer in timed cooperation with the conveying means to produce effectiveness of the operative face with alternate pie-plate holders.

5. A pie-making machine comprising circuitous conveying means, an odd number of pie-plate holders carried by said conveying means, relatively stationary delivery means for placing crusts on alternate holders as the holders pass said delivery means, and a relatively stationary trimmer operating to trim crusts only as alternate holders pass thereby.

6. In a pie-making machine a crust trimming device in the form of a frustum on a cone, with a cut-away side, the conical surface being provided with shearing edges, and said device having projecting from the cut-away side thereof a docker.

DENNIS W. SMITH.